(12) United States Patent
Cooper (10) Patent No.: US 12,160,456 B2
(45) Date of Patent: Dec. 3, 2024

(54) APPARATUS AND METHOD FOR MULTI-CAST STREAMING

(71) Applicant: Robin Ross Cooper, La Mesa, CA (US)

(72) Inventor: Robin Ross Cooper, La Mesa, CA (US)

(*) Notice: Subject to any disclaimer, the term of this patent is extended or adjusted under 35 U.S.C. 154(b) by 0 days.

(21) Appl. No.: 17/319,048

(22) Filed: May 12, 2021

(65) Prior Publication Data

US 2021/0360044 A1 Nov. 18, 2021

Related U.S. Application Data

(60) Provisional application No. 63/023,357, filed on May 12, 2020.

(51) Int. Cl.
| | |
|---|---|
| *H04L 65/611* | (2022.01) |
| *H04L 65/1023* | (2022.01) |
| *H04L 65/612* | (2022.01) |
| *H04N 21/262* | (2011.01) |
| *H04N 21/43* | (2011.01) |

(52) U.S. Cl.
CPC ........ *H04L 65/611* (2022.05); *H04L 65/1023* (2013.01); *H04L 65/612* (2022.05); *H04N 21/26266* (2013.01); *H04N 21/4307* (2013.01)

(58) Field of Classification Search
CPC ............. H04L 65/4084; H04L 65/1023; H04L 65/4076; H04L 65/611; H04L 65/612; H04N 21/26266; H04N 21/4307; H04N 21/262; H04N 21/43

USPC ......................................................... 709/231
See application file for complete search history.

(56) References Cited

U.S. PATENT DOCUMENTS

| | | | |
|---|---|---|---|
| 11,006,238 B1* | 5/2021 | Jung ..................... | H04W 84/18 |
| 2008/0201748 A1* | 8/2008 | Hasek ..................... | G06F 21/10 |
| | | | 725/111 |
| 2009/0300673 A1* | 12/2009 | Bachet ................. | H04N 21/632 |
| | | | 725/31 |
| 2015/0181489 A1* | 6/2015 | Chong .................. | H04W 72/20 |
| | | | 370/331 |
| 2015/0378522 A1* | 12/2015 | Butts ...................... | G06F 16/60 |
| | | | 715/716 |

(Continued)

*Primary Examiner* — Schquita D Goodwin
*Assistant Examiner* — Mehulkumar J Shah
(74) *Attorney, Agent, or Firm* — FisherBroyles LLP; James P. Cleary (57) ABSTRACT

A multicasting download-to-mobile-device service that broadcasts and distributes digital media over cellular networks is described. The most preferred embodiments of the present invention comprise a network that distributes a plurality of media titles (e.g., movies, tv shows, concerts, etc.) via multicast streams where the media titles are stored in local storage on a mobile electronic device (e.g., cellular telephones and tablets) and, by way of a mobile device app, allows users to play the stored media titles locally from their devices using current on demand playback methodologies. In addition, at least some preferred embodiments of the present invention comprise a data carousel that curates and delivers discrete media titles to selected cell towers and/or hubs, thereby providing for relevant media titles to be multicast to discrete regions and not the entire network. Finally, the data carousel may be configured to synchronize relevant titles for discrete users of the service.

20 Claims, 4 Drawing Sheets

(56) References Cited

U.S. PATENT DOCUMENTS

| | | | |
|---|---|---|---|
| 2018/0287869 A1* | 10/2018 | Munafo | H04W 12/069 |
| 2018/0357490 A1* | 12/2018 | Mitra | G06V 10/764 |
| 2020/0037035 A1* | 1/2020 | Kaufman | H04N 21/2402 |
| 2021/0144517 A1* | 5/2021 | Guim Bernat | H04L 47/781 |

* cited by examiner

APPARATUS AND METHOD FOR MULTI-CAST STREAMING

CROSS-REFERENCE TO RELATED APPLICATIONS

The present patent application claims the benefit of U.S. Provisional Patent Application No. 63/023,357, which application was filed on May 12, 2020 and which application is incorporated herein by reference.

BACKGROUND OF THE INVENTION

1. Field of the Invention

The present invention relates to streaming video content and, more specifically, the invention relates to the use of cellular networks to facilitate consumption of video content via mobile devices.

2. Background

The use of mobile cellular devices such as cellular telephones is a worldwide phenomenon. Powerful and inexpensive cellular telephones are in widespread use on practically every continent and in every country. In many first world countries, such as the United States of America, Japan, France, and similar countries, the coupling of mobile devices (e.g. mobile phones and tablets) with ubiquitous free or low-cost wireless Internet access points and broadband networks provides a powerful means of consuming digital content, including various forms of streaming media. Unlimited talk, text, and data are common features of first world phone plans and readily available by simply paying a single monthly subscription fee to one of many different cellular companies.

However, in many other countries, including countries located on the continent of Africa as well as many other third world countries, opportunities for digital media consumption are significantly more limited. This is due, in large part, to a number of factors endemic to third world countries. First, WIFI broadband networks and high speed mobile cellular networks are much less available in many third world countries, relegating cell phone users to traditional cellular networks and data plans, which are generally much more expensive and less efficient for consumption of digital content, including streaming media.

Additionally, while many first world citizens have access to carrier-sponsored monthly subscription plans to pay for access to cellular networks and services, many citizens in third world countries utilize pre-paid "pay-per-use" plans to gain access to cellular networks and services. In these locations, cellular phone users routinely purchase "data minutes" or other form of data send/receive capacity from a local retail outlet, (e.g. a convenience store or cell phone retail outlet) and then enter a unique code into their cellular that was provided to them at the point of sale. This unique code will add minutes or data usage capacity to their existing cellular phone which are gradually consumed until such time as the minutes or purchased data usage capacity is exhausted. The consumer will then return to the retail outlet and purchase additional minutes or data capacity. While widely accepted, this approach can be quite costly for consuming large quantities of digital media such as streaming video such as pre-recorded movies, television shows, and even live events such as concerts.

Accordingly, there remains a need to provide alternatives for consuming digital streaming media via mobile devices in many locations. Particularly, the ability to consume movies and other high-bandwidth digital media in third world countries or similar locations without paying for large quantities of expensive cellular data is simply not a realistic possibility for many people in the world. Without improvements in the current art for data streaming and consumption, the opportunities to consume meaningful quantities of streaming digital media content will continue to be suboptimal for large segments of the world's population.

BRIEF SUMMARY OF THE INVENTION

A multicasting download-to-mobile-device service that broadcasts and distributes digital media over cellular networks is described. The most preferred embodiments of the present invention comprise a network that distributes a plurality of media titles (e.g., movies, tv shows, concerts, etc.) via multicast streams where the media titles are stored in local storage on a mobile electronic device (e.g., cellular telephones and tablets) and, by way of a mobile device app, allows users to play the stored media titles locally from their devices using current on demand playback methodologies.

In addition, at least some preferred embodiments of the present invention comprise a data carousel that curates and delivers discrete media titles to selected cell towers and/or hubs (e.g. an E-UTRAN Node B, also known as Evolved Node B or "eNB" or "eNodeB"), thereby providing for relevant media titles to be multicast to multiple discrete geographical regions and not the entire network footprint. Finally, the data carousel described herein may be configured to synchronize with various settings, established within the mobile device app, to capture titles with the highest degree of relevance for discrete users of the service based on user preference, location, genre, affinity groups, etc.

For example, a media consumer may establish their age, sexual orientation, employment, geographic location, etc. in the mobile device app and establish a profile. Then, based on the profile, the data carousel will be populated with the most relevant matches for the media consumer's profile. Accordingly, each media consumer is likely to have access to a completely different selection of media titles, based on their unique profile. Similarly, a media consumer can join one or more social media groups or other affinity organizations that will further stratify the media offerings presented for consumption. This highly stratified approach will maximize the potential for successful media recommendations, with predictive recommendations getting better over time. For all relevant business models disclosed herein, standard data encryption techniques may be employed to protect digital data from unauthorized access.

In addition to local mobile device storage, at least one preferred embodiment of the present invention will provide for temporary cloud storage for mobile devices with limited internal storage capacity where digital media files may be stored for later download and consumption when additional local storage is available or playback via WIFI, once available.

Similarly, as many mobile devices found on the market today have limited internal storage capacity, an external data storage device may be removably affixed to the mobile device and communicatively coupled to the mobile device (e.g., via Bluetooth, cable, etc.), thereby effectively increasing the available storage capacity of the mobile device.

BRIEF DESCRIPTION OF THE DRAWINGS

The various preferred embodiments of the present invention may be described in conjunction with the appended drawings wherein like designations denote like elements, and.

DETAILED DESCRIPTION OF THE PREFERRED EMBODIMENTS

A multicasting download-to-mobile-device service that broadcasts and distributes digital media over cellular networks is described. The most preferred embodiments of the present invention comprise a network that distributes a plurality of media titles (e.g., movies, tv shows, concerts, etc.) via multicast streams where the media titles are stored in local storage on a mobile electronic device (e.g., cellular telephones and tablets) and, by way of a mobile device app, allows users to play the stored media titles locally from their devices using current on demand playback methodologies. The media titles may include augmented reality or virtual reality media as well.

In addition, at least some preferred embodiments of the present invention comprise a data carousel that curates and delivers discrete media titles to selected cell towers and/or hubs (e.g. an E-UTRAN Node B, also known as Evolved Node B or "eNB" or "eNodeB"), thereby providing for relevant media titles to be multicast to multiple discrete geographical regions and not the entire network footprint. Finally, the data carousel described herein may be configured to synchronize with various settings, established within the mobile device app, to capture titles with the highest degree of relevance for discrete users of the service based on user preference, location, genre, affinity groups, etc.

The most preferred embodiments of the present invention further comprise a multicasting download-to-mobile-phone service with two levels of curation for media titles. The first curation level comprises a curated data carousel that has been created for the needs of a specific region (e.g., a specific cell tower and/or associated ENodeB). The second curation level comprises curation of the media titles based on preference settings in the mobile app used to store and maintain the media titles.

Additionally, most preferred embodiments of the present invention comprise an artificial intelligence server connected to the network that predicts the creation of the data carousels over time and allows for various artificial intelligence algorithms to be finely tuned over time by way of feedback loops, media consumption and usage tracking, back channels and/or back haul channels established within the network.

Mobile networks can "broadcast" digital video data to virtually all devices within the mobile network footprint. There are different names for such broadcast functionality, however it is most commonly referred to as LTE-Broadcast ("LTE-B") or Evolved Multimedia Broadcast and Multicast Services ("eMBMS"). Another industry term for such broadcast capability is "multicasting," meaning broadcasting from a single source to multiple recipients vs. "unicasting," meaning broadcasting from a single source to a single recipient.

An additional component for eMBMS or LTE-B multicasting is the eMBMS middleware that allows for revenue generation by way of subscriptions, transactions, government sponsored or ad-supported business models when distributing multimedia content. Such middleware provides additional functionality for users to register and be authenticated.

The multicasting business model described herein provides for a broadcaster to pay a given mobile carrier a fee to use a plurality of multicast streams on a substantially continual basis (e.g., all day, all night, each day/365 days a year) via the carrier's cellular network. These multicast streams will broadcast digital media (e.g., movies, television shows, concerts, sporting events, etc.) on a substantially continuous basis to all mobile devices within its network footprint.

Users in the relevant geographic area can then capture the digital media via a mobile app installed on their mobile device (e.g., cellular telephone or tablet) and store the digital media locally on their mobile device. Once captured, the media consumer can access and consume the digital media using their mobile device without incurring any charges, other than the charges associated levied by the digital media provider or the provider of the mobile app. In this fashion, the mobile device will provide functionality somewhat similar to a digital video recorder or DVR. The most preferred embodiments of the present invention provides DVR-like functionality for ordinary mobile devices without accumulating data charges related to mobile or broadband network access. Such DVR capabilities referred to in this application as Pre-Positioning.

For purposes of this disclosure, the term "pre-positioning" refers to digital data such as media titles that is captured and stored locally on mobile devices so a media consumer can access downloaded the media titles without connecting to a mobile and/or WIFI network. For the purposes of this disclosure, digital data can be captured on mobile devices using three methods as follows: (i) multicast streams (rather than a unicast stream) from mobile or WIFI networks; (ii) a combination of multicast streams and/or unicast streams from mobile or WIFI networks; and (iii) unicast streams only from mobile or WIFI networks, when multicast networking is unavailable.

Additionally, since there are no data charges associated with monitoring multicast streams, media consumers can amass large libraries of digital media without the need of purchasing. Similarly, the media consumer will not incur data charges when consuming the media because the media playback occurs on their mobile device. Basically, the mobile app on the mobile device is configured to pull selected digital media "off the air" and then stores the data in the memory of the mobile devices. This digital media, primarily movies and television shows, can then be viewed at a later time with perfect clarity and resolution. Users are therefore enabled to collect huge libraries of videos over time, with perfect playback, while also engaging in social media-based content discovery experiences that help them to enjoy the service within more of a community setting via the user preferences in the mobile app.

While no data charges may be incurred in the collection of digital media titles, in at least one preferred embodiment of the present invention an "on demand" facility may be employed to generate transactional revenue. This "On-Demand" facility allows users to request that titles be played, however with the understanding that certain fees and other data charges may apply. The transactional service will allow immediate access to a large library of content titles for those who would not choose to pay a monthly subscription fee. Additional service fees may be incurred for additional services, including a subscription fee that allows access to a certain number of media titles per month for media consumers that do not want to view advertising as part of their media consumption.

Additionally, at least one preferred embodiment of the present invention would generate revenue via ad-supported services, leveraging state-of-the-art advertising methodologies in order to monetize ad impressions. This would include national, regional, local, targeted, addressable, user-selected and programmatic advertising delivery mechanisms.

Given the various options, revenue generation can be accomplished in a number of ways, traditional and non-traditional. Traditional revenue streams include: (i) advertising; (ii) monthly subscriptions; (iii) transactional (e.g. one time) media downloads based on a user-generated request; (iv) government sponsored (e.g., education and information services). Non-Traditional Revenue Streams include: (i) donations from charitable organizations; (ii) sponsorships from organizations; (iii) sponsorships and donations from political organizations, etc.

From each cell tower, numerous multicast streams can be sent across the tower's footprint, around the clock, every day of the week. For example, 20 to 100 multicast streams can be sent from a single cell phone tower, allowing users to pull large libraries of content from these multicast streams and store them locally, to be viewed on demand at a future time.

Media consumer will be able to download the mobile app from all standard mobile app providers. Account setup and identity verification can be accomplished via industry standard techniques built into the mobile app. The mobile app will also allow the media consumer to annotate and organize media titles and to delete media titles once they have been consumed so as to maximize storage resources.

It's assumed the video files must be re-broadcast again and again for everyone in range of the mobile network to receive the video files with no lost bits (or bytes). Therefore, the mobile app will know which bits (or bytes) are missing for partially received video files and fill-in the missing video data when files are re-broadcast. When all bits (and bytes) have been successfully received, a text message will be sent to the user indicating the video can now be viewed in its entirety.

If the user clicks on this video title that has been received in its entirety and now becomes visible within the mobile app, the video file will then play locally. It is assumed the user will delete the video file soon after it is played to make room for future videos.

What's important to note is the user is not being charged to receive this video data. It is the streaming media company that pays the mobile carrier for the multicast streams, likewise, the streaming media company is responsible to pay all costs for acquiring high-value digital video or media titles. In at least one preferred embodiment of the present invention, the media consumer may be required to watch advertising from time to time as part of a monetization model, similar to many streaming media options available today.

It is also assumed that such a multicast network will be ideal as an advertising platform although ad revenues may be small when compared to ad revenues generated in first-world regions. In the end, the vast number of people that can be reached by way of a multicast network distribution model may well make up for the low advertising rates and a successful business model may result.

Although local advertisers such as restaurants and furniture stores have found the internet a good place to purchase ad impressions such as banner ads and web links, it has been challenging for them to place ads within video clips. Today, consumer's expectations have increased, and they are significantly more influenced by high-resolution video ads than rich-text or banner ads.

The main reason local advertisers don't use video advertising systems or technologies is due to the lack of infrastructure that allows for such hyper-targeting (such as within the advertiser's neighborhood), not to mention the challenges these local advertisers face when burdened with the requirement to create their own video ads.

Since the aggregation of local advertisers represents enormous revenue opportunities for Direct Mobile, efforts will be made to assist these smaller advertisers with the creation of engaging ads (using Direct Mobile's ad creation tool sets, sample backgrounds, and music libraries), and then allow for the insertion of their ads when potential customers are identified and targeted with relevant messages from these advertisers.

Although on-line video advertising systems have performed reasonably well over the last 15 years or so, they are often limited when it comes to video ad insertion, as the demands for splicing and switching into highly compressed video are simply too great—even over fiber optic networks. It's not only the amount of data that needs to be distributed to millions of potential users simultaneously as it's the numerous other functions that need to take place that, when combined, tax even high-capacity networks to a degree that causes buffering processes and associated delays. Some of these processes include (but are not limited to) transcoding, filtering, switching and virus-checking. Therefore, mobile networks tend to deliver non-targeted video ads to large groups of users better than they can deliver more targeted video ads to individual users. With these issues in mind, network architects would look to distribute "user-specific" or "addressable" ad insertion functions in such a way as to allow for more network capacity in order to perform seamless (frame-accurate) "user-specific" ad splicing functions.

Since the primary (basic) model of the multicasting service provides for Pre-Positioning media titles in local storage, ads can be spliced into the content without the worry about real-time splicing and other "just-in-time" issues that often add complexity to advanced advertising systems.

Given the ease with which ads can be inserted by way of a Pre-Positioning model, all next generation advertising methodologies can be employed including the following: National Advertising; Regional Advertising; Local Advertising; Targeted Advertising (based on high-level criteria); Addressable Advertising (based on user's personal criteria); User-Selected Advertising; Programmatic Advertising; Native Advertising; Native Programmatic Advertising In addition to these advertising methodologies, Loyalty Systems can be added to each of these ad delivery mechanisms that will allow for the distribution of valuable incentives to those who watch the ads. More about Direct Mobile's Loyalty Systems will be provided later in this plan.

Video data will be made available in whatever form that may be suitable for the application environment. In addition to the MPEG data, other data elements can be provided within Multicast (or Unicast) streams as follows: Encryption keys, Synchronization Information, Monitoring Information, and Meta-Data.

Figure 1:
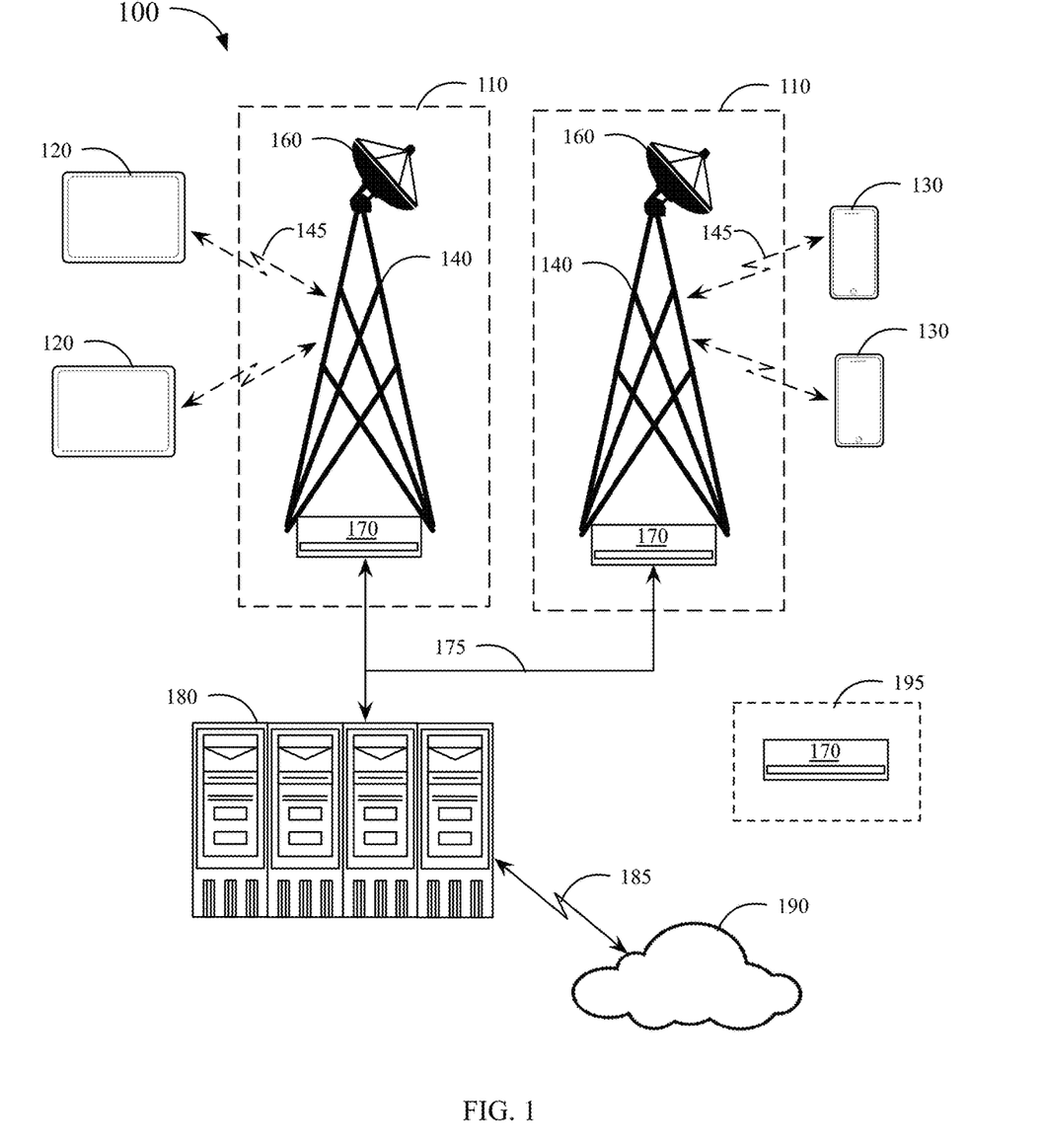
FIG. 1 is an apparatus that provides a network for multicast streaming of digital media in accordance with a preferred exemplary embodiment of the present invention.

Referring now to FIG. 1, a network based apparatus 100 for multi-cast streaming in accordance with a preferred exemplary embodiment of the present invention is depicted. As shown in FIG. 1, a plurality of gateways 110 are configured to provide digital media to a plurality of digital mobile devices, including cellular phones 130 and tablets 120, via multicasting over a cellular communication channel 145.

Each gateway 110 comprises at least a cellular tower 140. Cellular tower 140 represents any industry standard cellular tower known to those skilled in the art and, depending on the application, may include a satellite antennae or transceiver 160 for communication via a standard satellite link. In at least some preferred embodiments of the present invention, each gateway 110 will further comprise a middleware server 170 that is used to control digital media distribution via gateway 110. Optionally, an eNodeB device 195 may be used in conjunction with a middleware server 170 to control multiple gateways 110 in which case there will be no middleware server 170 associated with each gateway 110. Multiple eNodeB facilities may be connected to a command-and-control center 180 via an aggregation point (not shown this FIG.).

Command-and-control center 180 comprises a computing center or facility that oversees the operation and performance of multiple instances of apparatus 100 that may be deployed in various locations throughout the world. Each gateway 110 will be communicatively coupled to command-and-control center 180, thereby allowing data from all gateways 110 to be consolidated and analyzed. Each gateway 110 is communicatively coupled to command-and-control center 180 via connection 175, where connection 175 comprises any communication method suitable for the application. This may include satellite, microwave, fiber optic cable, Internet, RF communication, wired communication, etc. Cloud 190 and connection 185 are representative of these various communication methodologies. Command-and-control center 180 will also manage authentication by interacting with one or more certificate issuing authorities.

eNodeB 195 facility comprises a network component that communicates directly (wirelessly) with mobile handsets (similar to a base receiver station in GSM networks). In at least one alternative preferred embodiment of the present invention, one or more middleware servers 170 can be located within a eNodeB 195 facility. A single eNodeB 195 can communicate with numerous cell towers 140 simultaneously.

In at least some preferred embodiments of the present invention, all communications between the various components of apparatus 100 and consumers of the digital media are conducted using digitally signed envelopes (DSEs) based on X.509 certificate issued by a certificate authority or some other form of cryptographically secure exchange methodology so as to validate messages between each entity and media consumer connected to the network of apparatus 100.

Once connected to the network of apparatus 100, the following functions will be available to media consumers via cellular phones 130 and tablets 120: Receive numerous simultaneous Multicast streams from the Mobile Network; Store large numbers of video content titles on Smart Devices (phones); Continue to receive video data to fill-in any gaps that might exist within incomplete MPEG file data; Receive "Live" (Multicast) events; Receive Unicast Streams when necessary (multicasting is not available or not the best methodology); Splice ads into these Multicast (or Unicast) streams in order to generate significant advertising revenues; Next-generation video delivery services (VR/AR—Gaming and others); Synchronize with cloud-based "command-and-control" center; Allow alternative "On-Demand" (unicast) delivery of titles from the streaming library at the user's command.

In order to achieve this functionality, those skilled in the art will recognize that cellular phones 130 and tablets 120 will be configured with a downloadable mobile application, thereby allowing for communication and interaction with the network of apparatus 100. A companion web site is also available for configuration and establishing various account options. The mobile app provides numerous preference settings that allow users to: specify account and profile settings; specify the type of content to be downloaded; specify Social Media Groups, Channels or Teams; specify other content preferences and parameters; specify the types of "live" events that are preferred; facilitate alternative "on-demand" content delivery functions; provide criteria for the deletion of titles (allowing more storage for new titles); provide access to tools and features to further enhance the overall media consumption experience; provide other features and services consistent with the delivery of media content; etc.

In addition, the user interface for the mobile app will provide typical interaction features such as navigation buttons, "skip," "like," and "dislike" buttons, multiple screens that are reconfigurable based on consumer preferences and application functionality. Additionally, download progress bars will provide a visual indicator of the status of each downloading media title and initiate a notice (audio signal, visual signal, haptic feedback, etc.) to notify the media consumer that the download is complete.

Once media consumers are connected to the mobile app and are in range of WIFI signals, and have appropriately logged-on, media files will be unicast throughout the WIFI footprint, allowing media consumers to "catch" these digital media files on cellular phones 130 and tablets 120. When the digital media files arrive on one or more of the mobile devices, the user will receive a notification that files have arrived. Over time, users will see menus appear with titles sorted by category. Users can then play these titles at any time, with no restrictions whatsoever. After the titles have been viewed, users will be able to delete titles from storage, allowing for more downloads in the future.

On the backend of the multicasting service, artificial intelligence-based analytical systems will be used to capture media consumption preference data from mobile device activity that may be analyzed to better understand individual user's patterns and preferences, as well as general group preferences and usage patterns. Each user's data will be periodically transferred back to command-and-control center 180 using small data bursts, targeting times when data usage is either free or relatively inexpensive.

In the most preferred embodiments of the present invention all "file-based" media content will be loaded to the middleware servers 170 from cloud-based command-and-control center 180, and that "live" streams will be delivered from satellite dishes 160. From time to time it may be possible for the opposite to take place. "Live" data can be delivered from cloud-based command-and-control center 180, and "file-based" data can be delivered from satellite dishes 160. These may be special cases, however the hardware and software systems that are deployed within cell towers 140 will have this capability. In the future it is envisioned that backhaul data to and from network aggregation points (and central offices) will be transported over fiber optic cable and/or LEOs (or other futuristic satellite networks).

The mobile app is configured to "search and discover" available mobile networks and WIFI networks in order to load digital media files in the most efficient manner possible. In some cases, a media consumer may be traveling from place to place, and a mobile network may provide the best point of network access. In another case, such a media consumer may be stationary, and a WIFI connection will provide the best point of access. The mobile app will always attempt to find the best point of access to improve the level of service at that time.

Using an example where a media consumer may be in a retail facility that has partnership agreement with the operators of the streaming service, it may be possible to connect to WIFI without actually logging into an account. An example could be a restaurant, where a search may yield the discovery of WIFI network owned and operated by the restaurant. Such strategic partnership with the restaurant may then allow users to automatically log-on to the WIFI network using a master login "key" provided by the restaurant, to allow users with a better network connection during that time frame. When WIFI networks are found, and the user logs-on, every effort will be made to download as much content from those WIFI networks as possible (assuming no data charges are being applied). In some cases, this could expedite the delivery of new content titles significantly.

Figure 2:
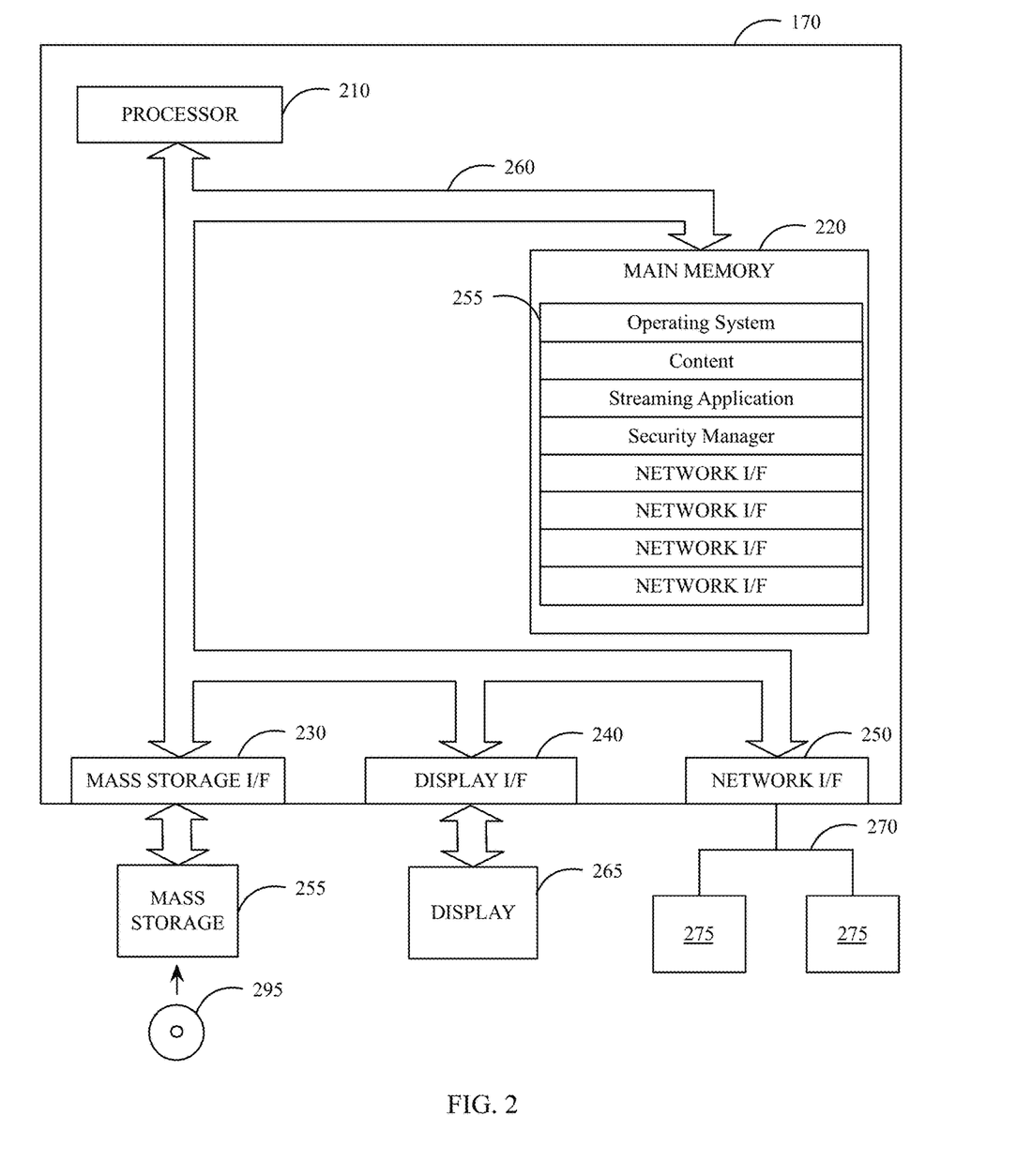
FIG. 2 is a computer system suitable for use in conjunction with an apparatus for multicast streaming of digital media in accordance with a preferred exemplary embodiment of the present invention.

Referring now to FIG. 2, a block diagram of a middleware server 170 is depicted. Middleware server is one suitable implementation of a computer system that is capable of performing the computer operations described herein including dynamic management of processing element connections in streaming applications. Computer system 170 comprises any computer which can run multiple operating systems including an IBM operating system. However, those skilled in the art will appreciate that the disclosure herein applies equally to any computer system, regardless of whether the computer system is a complicated multi-user computing apparatus, a single user workstation, laptop, phone or an embedded control system.

As shown in FIG. 2, computer system 170 comprises one or more processors 210. Computer system 170 further includes a main memory 220, a mass storage interface 230, an optional display interface 240 and, typically, a network interface 250. These system components are interconnected through the use of a system bus 260. Mass storage interface 230 is used to connect mass storage devices with a computer readable medium, such as mass storage 255, to computer system 170. One specific type of mass storage 255 is a readable and writable CD-RW drive, which may store data to and read data from a CD-RW 295. Some mass storage devices may have a removable memory card or similar instead of the CD-RW drive.

Main memory 220 preferably contains an operating system 221. Operating system 221 is a multitasking operating system known in the industry as IBM; however, those skilled in the art will appreciate that the spirit and scope of this disclosure is not limited to any one operating system and any operating system known to those skilled in the art may be deployed if suitable for the functions described herein. Memory 220 further includes digital content 222; one or more streaming applications 223; security manager 224; one or more carousels 225; and data 226.

Computer system 170 may utilize well known virtual addressing mechanisms that allow the programs of computer system 170 to behave as if they only have access to a large, single storage entity instead of access to multiple, smaller storage entities such as main memory 220 and mass storage 255. Therefore, while operating system 221, digital content 222, one or more streaming applications 223, security manager 224, one or more carousels 225, and data 226. are shown to reside in main memory 220, those skilled in the art will recognize that these items are not necessarily all completely contained in main memory 220 at the same time. It should also be noted that the term "memory" is used herein generically to refer to the entire virtual memory of computer system 170, and may include the virtual memory of other computer systems coupled to computer system 170.

Processor 210 may be constructed from one or more microprocessors and/or integrated circuits. Processor 210 executes program instructions stored in main memory 220. Main memory 220 stores programs and data that processor 210 may access. When computer system 170 starts up, processor 210 initially executes the program instructions that make up operating system 221 and later executes the program instructions that make up the streaming applications 223 to deliver digital content 222.

Digital content 222 comprises the available universe of digital data and media titles available to all media consumers in the footprint of the gateway associated with middleware server 170;

Streaming applications 223 comprises the application software that communicates with the mobile app installed on the digital devices for media consumers in the footprint of the gateway associated with middleware server 170.

Security manager 224 comprises the various security and digital certificates used to control access to digital content 222.

Carousel 225 represents a specific collection of digital data and media titles to be delivered to users of the network associated with apparatus 100.

Data 226 comprises additional data used to monitor, control, and operate middleware server 170 and the associated network of digital media delivery services may include aggregated user preference data, usage data, etc.

Although computer system 170 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 210. However, those skilled in the art will appreciate that these functions may be performed using I/O adapters as well.

Display interface 240 is used to directly connect one or more displays 265 to computer system 200. These displays 265, which may be non-intelligent (i.e., dumb) terminals or fully programmable workstations, are used to provide system administrators and users the ability to communicate with computer system 170. Note, however, that while display interface 240 is provided to support communication with one or more displays 265, computer system 170 does not necessarily require a display 265, because all needed interaction with users and other processes may occur via network interface 250 (e.g. via web client-based users).

Network interface 150 is used to connect computer system 170 to other computer systems or workstations 275 via network 270. Network interface 250 broadly represents any suitable way to interconnect electronic devices, regardless of whether the network 270 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be an apparatus or system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the various figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the most preferred embodiments of the present invention, the mobile app, like other mobile apps gains access to a multicast streams by way of "joining" an existing multicast IP address. Once a discrete multicast IP address has been "joined", file data may be captured, stored, and then categorized. A mobile device can join as many multicast streams as the user's device resources will allow.

As for live broadcast multicast streams, these can only be viewed in real-time (e.g., live sporting events or concerts. These live video streams are captured by way of the mobile app "joining" one or more IP multicast streams. Numerous multicast streams can be joined simultaneously, however the mobile device resources may become over-burdened.

When the user activates the mobile app, and then de-activates the mobile app, there is a facility in most situations that will continue to download process until the download process has concluded. Therefore, once a multicast stream has been initiated, the download process will generally continue, since the Multicast stream is being provided by way of a continuous carousel.

For Multicast streams delivered to iOS devices, the App either needs to remain activated, and can be seen running during a Home button double-click, or if de-activated, similar background processes can remain activated, in coordination with associated approvals and software capabilities. iOS already supports the continuation of certain file downloads after a mobile app has been de-activated. If the mobile device is shut-down by the user or otherwise powered-off, the multicast streams will typically be halted, and will resume the mobile app is re-launched.

Command-and-control center 180 of FIG. 1 is responsible to create the various "Carousel Data Packages" (and priorities for these data packages) that are used to define specified "Data Carousels" that are sent to selected middleware servers 170 in cell towers 140. Once these selected cell towers receive these "Carousel Data Packages" (and associated priority meta-data), the servers within the towers will commence the multicasting processes for the encapsulated "Data Carousels". The command-and-control center will perform the "Carousel Data Packaging" functions by way of a dedicated server (also running in the cloud) named the "Carousel Package Server".

Since command-and-control center 180 knows the contents of all Carousels and it also knows the media consumers in the field, including their social media group affiliations), then command-and-control center 180 is well positioned to deliver "Guide data" to mobile devices so the mobile app installed on these devices will know the following: (i) which Multicast streams are available?; (ii) which Multicast streams have content titles that are to be downloaded by the user (by methods and means as presented in this plan)? (iii) which IP Addresses can be used to "join" available Multicast streams?; (iv) other relevant information regarding multicast streams and how to join them?

When the user initially downloads the mobile app (or should the app be terminated in such a way as to lose "Guide data"), then the user's device will use a small burst of data to request new "Guide data" from the command-and-control Center 180. Shortly thereafter, the command-and-control 180 will use its own small data burst to send "Guide data" back to the mobile app. From then on, "Guide data" will be provided to the mobile app by way of current and future Multicast streams. Such "Guide data" will be embedded in the Multicast streams in such a way that the App can locate them, extract relevant data and then "join" the proper Multicast streams at the right time.

It is possible for the mobile app to download the "Guide data" only (from a given Multicast stream), and bypass all of the media content. Alternatively, guide data can be downloaded in other ways using the mobile app and/or the streaming service website (or other similar facilities).

If "Live" streams are not being recorded, and the mobile app is closed, then such "Live" streams will be terminated, and no more "Live" data will be received on users' devices. If users want to resume playout of "Live" streams, then the mobile app must be re-activated.

Figure 3:
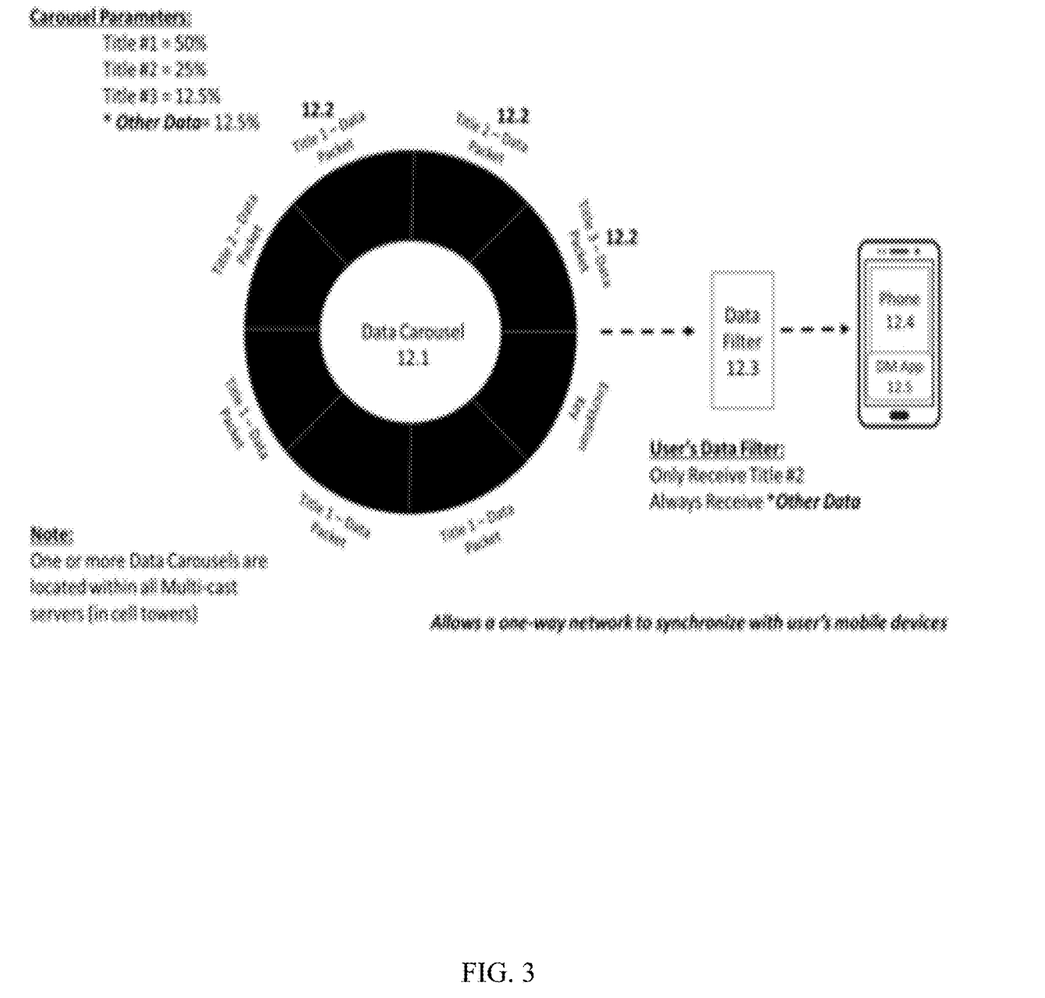
FIG. 3 is a carousel for digital media synchronization in accordance with a preferred exemplary embodiment of the present invention.

Referring now to FIG. 3, The Direct Mobile network and system is based on a common architecture referred to as a Data Carousel Such a Data Carousel is designed to resolve transmission issues between sending and receiving devices that are connected by way of a one-way network.

In a one-way network architecture, there are typically two different types of participants. One participant is referred to as the "pitcher" (as in the game of baseball where a pitcher throws the ball). The other participant is referred to as the "catcher" (defined as the player who catches the ball that is being pitched). The most common of "pitcher" and "catcher" networks are satellite networks where data is streamed from the sky, and satellite dishes "catch" these data streams. In the case of satellite-based content distribution networks (such as satellite TV services), the data is sent to earth in a one-way fashion (as the data is never sent back to the satellite).

The problem with a one-way network architecture is, it must mimic a two-way network using clever data distribution, storage and retrieval methodologies. For example, with a two-way network, the user's mobile device can request that a media channel be encrypted so session-based encryption keys can be generated and exchanged. On a one-way network, the sender has no knowledge of the receiver, and can only assume that one or more receiving devices are "listening". How will the sender know who needs encryption keys? And when do the keys need to be generated and securely distributed?

The solution to this problem revolves around the careful synchronization of server-side and client-side systems to predict the demands of the other and establish communication channels that allow for the transfer of data packets that can be stored and then processed at a time when they are needed. This is the way encryption keys are passed, program guides are updated, services are added (or cancelled), and many other functions are managed over a one-way network.

Understanding the challenges of one-way networks (and recognizing that Multicast streams are delivered as one-way transmissions (with a "pitcher" and a "catcher" arrangement), it is important that such a network be built upon a content distribution architecture that appears to act like a two-way network. The solution to the various challenges posed by way of a one-way multicast network architecture can be mitigated by leveraging the use of a technology named a "Data Carousel" or simply a "carousel" that, along with a companion App, synchronizes the transmission of data.

As shown in FIG. 3, the carousel operates in such a way as to synchronize both sides (of the one-way network), and in doing so, allows for the coordination of data being broadcast to users, and users capturing the media content they need to benefit from the service. As can be seen in the diagram above, the service operator defines the parameters for the Carousel regarding data packets being broadcast from the cell tower's antenna. In the example above, 50% of the Carousel is being used to send data packets from Title #1. As for Title #2, only 25% of the carousel will be dedicated for those packets. As for Title #3, only 12.5% of the carousel will be used for those packets. And finally, only 12.5% will be used for Other Data such as encryption keys, control data, meta-data and other overhead data.

As described herein, such a Data Carousel (12.1) allows prioritized Data Packets (12.2) to be delivered through a Data Filter (12.3) that is then sent to user's mobile phones (12.4). The mobile app (12.5) will then perform the functions as described in this disclosure. On the user's side, a synchronized Data Filter provided in Direct Mobile's App offers users the ability to establish parameter settings on their devices (as not all content titles should be downloaded). For example, if the user is a teenage boy, titles for senior citizens should not be downloaded. Therefore, the Data Filter is synchronized with the Carousel to make sure the two sides of the (one-way) network operate in such a way as to properly deliver media titles.

The Carousel can be updated instantaneously (on-the-fly) should a new content title be requested with a higher priority. The other titles within the Carousel will then be re-prioritized by making adjustments to the current Carousel parameters), and the new content title will be Multicast along with the other content titles from that point on.

Figure 4:
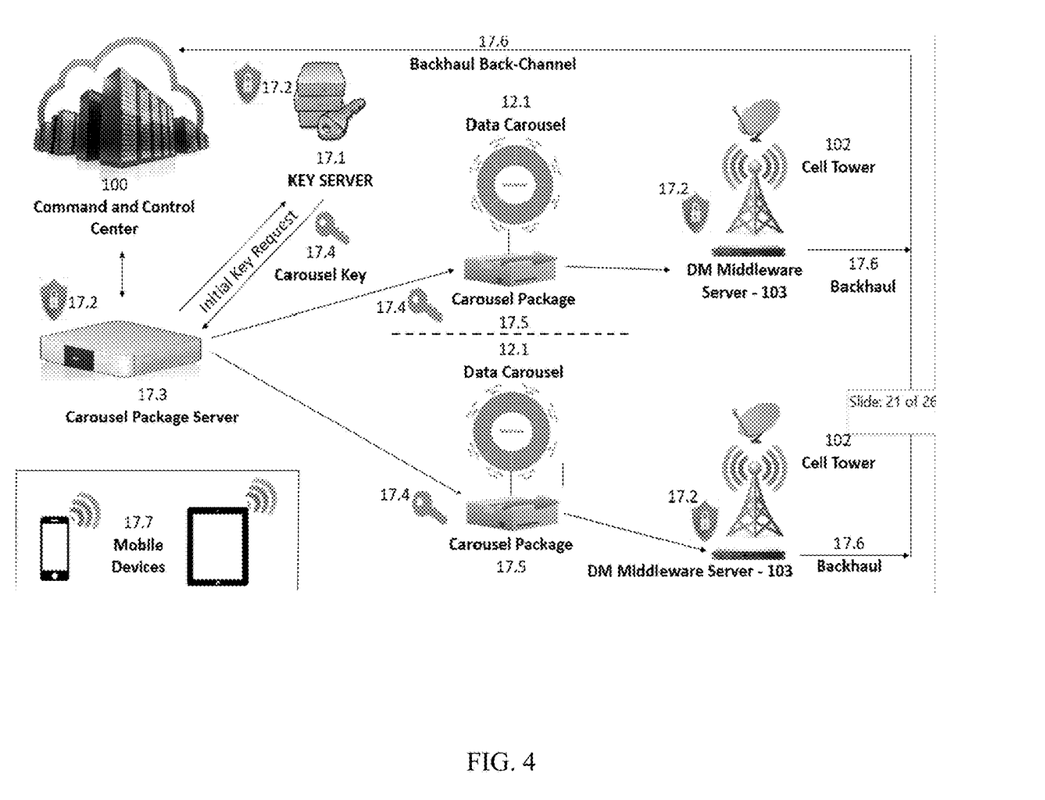
FIG. 4 is a carousel key distribution method in accordance with a preferred exemplary embodiment of the present invention.

Referring now to FIG. 4, a process for creating and processing digital certificates and keys is depicted. The digital certificates have been security distributed by way of a certificate authority (to the following network components: Key Server (17.1); Carousel Package Server (17.3); DM Middleware Server (103); each digital certificates are indicated by the Certificate icon labeled (17.2).

The Carousel Process flow then operates as follows. The Key Server (17.1) waits for a request from the Carousel Package Server (17.3) for a Carousel Key (17.4). A Carousel Key (17.4) is created (generated) and passed back to the Carousel Package Server (17.3). The Carousel Package Server (17.3) then creates a Carousel Package (17.5) and sends the Carousel Package (17.5) to one or more of the DM Middle Servers (103) along with a Carousel Key (17.4).

The Carousel Package (17.5) is created based on information received from individual DM Middleware Servers (103) in the field regarding the popularity of certain media titles (or genres) within that Cell Tower's (102) footprint. In this case, the demographics of the media consumers living or working in the transmission footprint of the cell towers may be used to customize the digital media distributed to mobile devices in the transmission footprint. The Cell Towers (102) send usage information to the command-and-control (100) over time which then again helps to create relevant Carousel Packages (17.5) for users within that location.

The DM Middleware Servers (103) then receive the Carousel Package (17.5) and authenticate and otherwise decrypt the Carousel Package (17.5) using the Carousel Key (17.4). The DM Middleware Servers (103) then sends information to the command-and-control (100) regarding the reception of the Carousel Package (17.5) and its success (or failure) in sending the media content (Multicast and/or Unicast) to users within the footprint of the Cell Towers (102). The DM Middleware Servers use the network Backhaul system (17.6) for such transmissions. Users are notified on their phones and tablets (17.7) regarding the successful capture of media data and their ability to play the media data once all bytes have been received (as described above).

Since this carousel packing model curates media files that are relevant to a specific cell tower's population, users within that tower's footprint can enjoy more targeted media content rather than content curated for larger groups such cities, states or the entire country.

This does not necessarily address users who are traveling or otherwise "in motion", however it will address the needs of a more stationary population which is appropriate for many populations around the world.

A Feedback Loop can be created for the Artificial Intelligence systems mentioned in this disclosure by way of the Backhaul Back-Channel (17.6).

In addition to the other possible approaches set forth above, various social media strategies may be deployed to enhance the media consumption experience. The strategy and associated tools and components are considered to be important as these items combine to enhance the recommendation engine systems and functions that users will use to avoid traditionally laborious search and discovery processes. Therefore, social media-based groups are designed to provide a high level of engagement, and the ability to make recommendations to each other within a group setting: (i) Affinity Groups; (ii) Channel Groups; (iii) Teams; and (iv) Romance (dating and matchmaking). Those skilled in the art will recognize these various groups as representative and not exhaustive.

The expectation is that the combination of social media recommendations along with social media engagement is a significantly better way to learn about compelling content titles than to spend time searching through huge lists of titles, even if they are of reasonable high-quality. Often, when likeminded people (friends) make recommendations to each other, the process becomes simple, and even fun. Below is a description of each group mentioned above along with its primary function.

Affinity Groups are created based on popular interests and activities that are enjoyed by the systematic aggregation of individual users according to lifestyles, affiliations, and sensibilities. These groups can then go on to exercise their influence by recommending content titles that reflect the preferences of the larger group. Examples of possible Affinity Groups could be as follows: (i) Mothers of Young Children; (ii) Young Boys who enjoy Video Games' (iii) Teenage girls who love Romantic Comedies; (iv) Men who love Football; (v) Women who love Fashion; etc. Each Affinity Group allows its members to vote for the titles they believe the larger group will enjoy.

After users select one or more Affinity Groups, carefully selected videos will then be sent to these users' mobile devices, based on the recommendations that are expressed within these groups. When individual users then "play" these videos, they will either enjoy them (as they share the group's content choices), or the videos will be found the be less than enjoyable, at which time such users may be encouraged to try other groups that will hopefully yield better results.

Channel Groups provide for optional collections of titles that are used to form continuous video streams that can be viewed by way of a more traditional television experience. Such channels may appear like familiar sports channels, cooking channels, or even shopping channels, however each channel is endorsed by one or more groups. Examples of Channel Groups could then be as follows: (i) Family-oriented Soap Operas (endorsed by: Mothers of Young Children)' (ii) Sports (endorsed by: Men who love football, and Fathers of Young Boys); (iii) Short Comedies (endorsed by: Young Boys who enjoy video games); etc.

In addition to user preferences, mobile app allows users to create their own teams by allowing friends and colleagues to define team structures and personnel (along with their goals and aspirations). Alternatively, users can join teams that are already in existence. The purpose for teams is to compete with one another. Teams will constantly be challenging each other, with the winners receiving valuable prizes and rewards. Examples of team challenges can be as follows: (i) Questions and Answers (about any subject); (ii) Playing pre-defined games; (iii) Creating new games and community experiences; (iv) Meeting at certain places and times to engage in (approved) head-to-head competition such as Team-Trivia (Questions and Answers), Team-math, Team-video games, etc. Efforts will be taken to verify that individual team members live in close proximity to each other (unless teams, according to their charter, have no need to meet in person).

The mobile app offers a dedicated service to those looking for romance. Events and services will be created to provide match-making opportunities by allowing partners to exchange content titles that express their own interests, preferences and sensibilities. Even married couples can take advantage of sending content titles to each other to enhance their relationships.

In at least one preferred embodiment of the present invention, various hardware devices may be configured to capture multicast streams as set forth herein and provide for the playback of the captured digital media to numerous users simultaneously. This embodiment is viewed as a solution that would be ideal for passenger vehicles (e.g., buses, trains, light-rail, taxis, etc.), as the digital media files are captured locally, and played with excellent playback clarity and no data charges, by way of a mobile network and/or WIFI. The hardware devices are designed in such a way to be as small as possible, so as to fit within virtually any passenger vehicle with power being derived from the passenger vehicle.

In addition to the preferred embodiments of the invention set forth above, additional embodiments of the present invention may include collaborative efforts with various cable, satellite and IPTV ("MVPD") operators who can also take advantage of the methods disclosed herein to allow multicast and unicast streams to be continuously downloaded to various set-top boxes, and then allowing these set-top boxes to download, store and categorize video titles by way of a connection (e.g., direct connection or WIFI connection) to a media consumer's mobile device. The set-top box will then stream the digital media to a television or other display device for viewing such as a mobile device that has the mobile app downloaded and installed.

Finally, those skilled in the art will recognize that even though the various preferred embodiments described herein are directed to digital media distribution without the use of a WIFI network, it is anticipated that a media consumer may periodically find themselves within a WIFI footprint with a no-cost or low cost option to access the Internet by WIFI. In these situations, the mobile app will recognize the high-speed connection and download any missing pieces of previously downloaded digital media files and will download newly selected but not yet downloaded digital media files as well. In this fashion, media consumers may enjoy a "free video download service" both when connected to the mobile network or WIFI.

Similarly, although the mobile app communication has largely been described as one-way with the "data carousel" being used to provide for one-way synchronization processes, those skilled in the art will recognize that the mobile app can be configured to engage in two-way communications by way of periodic "bursts" of data when the mobile device is connected to the network and by way of WIFI, if available. Any such "bursts" of data would be relatively small compared to the digital media files and would not likely increase the media consumer's data usage by any meaningful amount.

In the most preferred embodiments of the present invention, the data carousel will be filled with content titles that are scheduled to be multicast based on the knowledge of the target user's social media affinity groups.

The invention claimed is:

1. A method for multi-cast streaming, the method comprising the steps of:
   contracting for access to multicasting capabilities for at least one cellular transmission tower, the at least one cellular transmission tower being communicatively coupled to at least one middleware server, the at least one middleware server storing a plurality of digital media files;
   using an artificial intelligence server to predict the creation of a curated data carousel containing the plurality of digital media files;
   tuning a plurality of artificial intelligence algorithms over time by way of feedback loops, media consumption and usage tracking, back channels and back haul channels;
   using a multi-casting download-to-mobile-phone service with at least two levels of curation wherein a first curation level comprises a curated data carousel based on cellular communication needs of the cellular network of a specific region and a second curation level based on user-configurable settings of each of the at least one mobile device, wherein a selection of digital media files is based on a footprint of a cell tower;
   multicasting the plurality of digital media files to at least one mobile device communicatively coupled to the at least one gateway, wherein the curated digital media files are transmitted from the at least one cellular transmission tower to the at least one mobile device via a cellular network: and wherein user data is periodically transmitted to the command and control center with the timing of a data transmission being based on data usage fees; and
   pre-positioning the digital media files on a storage of the at least one mobile device for later access.

2. The method of claim 1 wherein the at least one cellular transmission tower comprises a plurality of gateways.

3. The method of claim 1 wherein the at least one mobile device comprises a plurality of cellular telephones and tablets.

4. The method of claim 1 further comprising the step of communicatively coupling an eNodeB facility to the at least one command-and-control center and to the at least one middleware server.

5. The method of claim 1 wherein the step of multicasting the plurality of digital media files to at least one mobile device communicatively coupled to the at least one gateway comprises the step of multicasting the plurality of digital media files based on the demographics of the population within the transmission footprint of the at least one cellular transmission tower.

6. The method of claim 1 wherein the at one cellular transmission tower further comprises a middleware server, the middleware server comprising:
   a processor;
   a memory coupled to the processor;
   an operating system residing in the memory;

a streaming application residing in the memory, the streaming application being executed by the operating system and wherein the streaming application is configured to receive the plurality of digital media files from the command-and-control center and cause the plurality of digital media files to be transmitted to the at least one mobile device.

7. The method of claim 6 wherein the memory further comprises at least one carousel residing in the memory, the at least one carousel being configured to store the curated digital media files and to synchronize the curated digital media files between the at least one middleware server and the at least one mobile device.

8. The method of claim 7 wherein the at least one carousel further comprises a data filter, the data filter providing information for synchronization of the plurality of digital media files between the at least one middleware server and a mobile application on the at least one mobile device.

9. The method of claim 8 further wherein the memory further comprises a carousel key, the carousel key being configured to encrypt or decrypt the plurality of curated digital media files.

10. The method of claim 1 further comprising a downloadable mobile application installed on the at least one mobile device, the downloadable mobile application providing for customization of the plurality of curated digital media files based on user preferences, social media groups, and demographics of media consumers living and working in the transmission footprint of the gateway.

11. An apparatus for multi-cast streaming, the apparatus comprising: at least one gateway, the at least one gateway being configured to multicast a plurality of digital media files;
at least one middleware server storing the plurality of digital media files, wherein a selection of digital media files is based on a footprint of a cell tower;
a data carousel that curates and delivers the digital media files to selected cell towers;
at least one command-and-control center communicatively coupled to the at least one middleware server and to the at least one gateway, the at least one command-and-control center receiving user data including usage fees for each user, the at least one command-and-control center monitoring and controlling a timing of a data transmission of the multicast of the plurality of digital media files;
user data is periodically transmitted to the command and control center with the timing of a data transmission being based on data usage fees,
at least one mobile device communicatively coupled to the at least one gateway, wherein the multicast stream of digital media is transmitted from the at least one gateway to the at least one mobile device via a cellular network, the at least one mobile device being configured to pre-position one or more of the digital media files on a local storage for later access;
using a multi-casting download-to-mobile-phone service with at least two levels of curation for media titles wherein a first curation level comprises a curated data carousel based on cellular communication needs of the cellular network of a specific region, and a second curation level based on user-configurable settings of each of the at least one mobile device;
and an artificial intelligence server, the artificial intelligence server being configured to predict the creation of the curated data carousel wherein a plurality of artificial intelligence algorithms are tuned over time by way of feedback loops, media consumption and usage tracking, back channels and back haul channels.

12. The apparatus of claim 11 wherein the at least one gateway comprises a plurality of gateways.

13. The apparatus of claim 11 wherein the at least one mobile device comprises a plurality of cellular telephones and tablets.

14. The apparatus of claim 11 further comprising an eNodeB, the eNodeB being communicatively coupled to the at least one command-and-control center and to the at least one middleware server.

15. The apparatus of claim 11 wherein the multicast stream of digital media comprises a multicast stream of digital media selected based on the demographics of the population within the transmission footprint of the at least one gateway.

16. The apparatus of claim 11 wherein the at least one middleware server comprises:
a processor;
a memory coupled to the processor;
an operating system residing in the memory;
a streaming application residing in the memory, the streaming application being executed by the operating system and wherein the streaming application is configured to:
receive the plurality of digital media files from the command-and-control center; to store the plurality of digital media files in a data carousel; and cause a first subset of the plurality of digital media files to be transmitted to the at least one mobile device, the first subset of the plurality of digital media files delivered to the at least one mobile device being different than a second subset of the plurality of digital media files delivered to a second mobile device based on a plurality of user preferences.

17. The apparatus of claim 16 wherein the at least one curated data carousel is configured to synchronize the digital content between the at least one middleware server and the at least one mobile device.

18. The apparatus of claim 17 wherein the at least one curated data carousel further comprises a data filter, the data filter providing information for synchronization of the plurality of digital media files between the at least one middleware server and a mobile application on the at least one mobile device.

19. The apparatus of claim 18 further comprising a carousel key that is configured to encrypt or decrypt the plurality of digital media files.

20. The apparatus of claim 11 further comprising a downloadable mobile application installed on the at least one mobile device, the downloadable mobile application providing for customization of the plurality of digital media files based on user preferences, social media groups, and demographics of media consumers living and working in the transmission footprint of the gateway.

* * * * *